(12) United States Patent
Rothweiler

(10) Patent No.: US 6,579,712 B1
(45) Date of Patent: Jun. 17, 2003

(54) SYSTEM FOR REPRODUCING AND DISPENSING BIO-CULTURES FOR BIO-AUGMENTATION AND METHOD THEREFOR

(75) Inventor: Thomas Samuel Rothweiler, 4331 E. Western Star Blvd., Phoenix, AZ (US) 85044-1007

(73) Assignee: Thomas Samuel Rothweiler, Phoenix, AZ (US)

( * ) Notice: Subject to any disclaimer, the term of this patent is extended or adjusted under 35 U.S.C. 154(b) by 0 days.

(21) Appl. No.: 09/234,153

(22) Filed: Jan. 19, 1999

(51) Int. Cl.⁷ ................................................ B09B 3/00

(52) U.S. Cl. ................. 435/262.5; 435/243; 435/252.1; 435/283.1; 435/289.1

(58) Field of Search ............................ 435/283.1, 289.1, 435/243, 252.1, 262.5; 210/601

(56) References Cited

U.S. PATENT DOCUMENTS

| | | | | |
|---|---|---|---|---|
| 3,607,735 A | * | 9/1971 | Hover et al. | |
| 3,666,242 A | * | 5/1972 | Fifer | |
| 4,210,528 A | * | 7/1980 | Coviello et al. | |
| 4,302,546 A | * | 11/1981 | Schlichting et al. | |

* cited by examiner

*Primary Examiner*—Leon B. Lankford, Jr.

(57) ABSTRACT

A system for reproducing and dispensing bio-cultures for bio-augmentation, and method therefor. The system comprises a bacteria solution breeding tank, a bacteria solution dispensing metering pump coupled to the bacteria solution breeding tank, an aeration pump coupled to the bacteria solution breeding tank, and an automatic control system coupled to the bacteria solution metering pump and coupled to the aeration pump. A waste-digesting bacteria additive is placed into the bacteria contact tank and added to the wastes and waste byproducts. The growth of the waste-digesting bacteria is enhanced by the addition of a controlled heating source coupled to the bacteria solution breeding tank and a re-circulation pump coupled to the bacteria solution breeding tank.

3 Claims, 1 Drawing Sheet

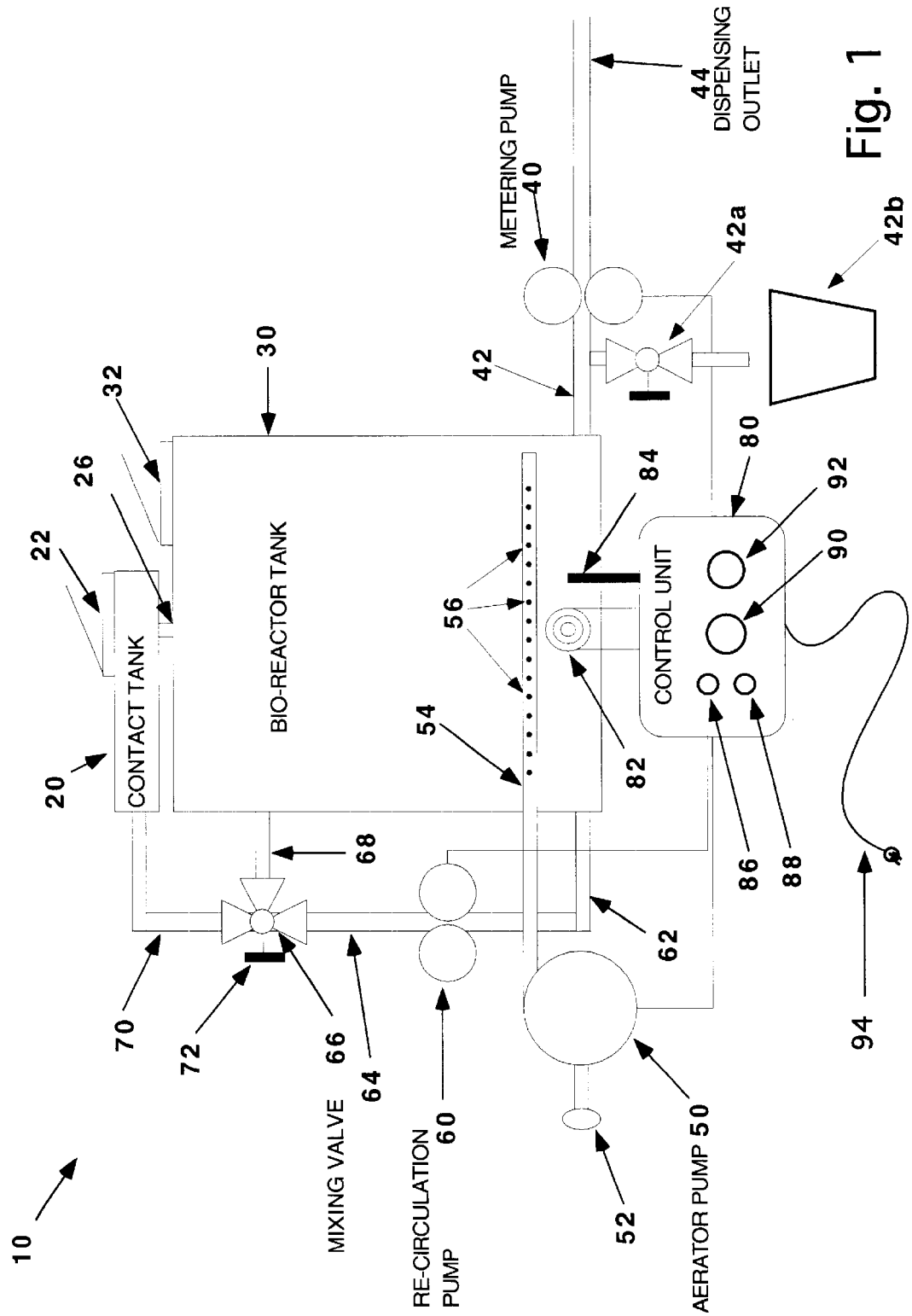

SYSTEM FOR REPRODUCING AND DISPENSING BIO-CULTURES FOR BIO-AUGMENTATION AND METHOD THEREFOR

BACKGROUND OF THE INVENTION

1. Field of the Invention

This invention is in the field of waste treatment systems and methods therefor, and more particularly, is a system and method for bio-cultural reproduction and a system and method of growing and applying super concentrated bio-cultures, including enzymes and bacteria, to waste and waste byproducts to accelerate their breakdown, reduce the toxicity thereof, and/or enhance bio-gas production.

2. Description of the Related Art

In nature, microbial or bacterial action in organic waste products takes place at a constant rate varying only due to temperature and moisture. The microbial action spoken of here is produced by, without being limited to, bacteria, enzymes, and other grown bio-cultures or bio-chemicals. In manmade waste sites, the microbial action is also dependent on the local environmental conditions present, temperature and moisture, in and around the waste materials. The operators of most manmade waste sites desire an accelerated microbial action however in order to reduce decomposition time, reduce toxic effects etc. Therefore, in order to accelerate the microbial action in manmade waste sites, most operators use a bio-remediation, or bio-augmentation, program. Bio-augmentation is the addition of concentrated bacteria or enzymes targeted toward a specific waste, accelerating the natural breakdown of the waste. By formulating a balanced mixture of bacteria in proper ratio for a particular application, an improvement over nature occurs. Since much of the waste today contains elements that the indigenous bacteria in a given system are not capable of degrading, even when invigorated with the addition of probiotic nutrients, a bio-augmentation program is utilized. In addition to much faster degradation, the selected bio-cultures can also retard the production of many of the gasses produced by the process of decomposition. Hydrogen sulfide and ammonia, both of which can be deadly in high concentrations, are major sources of odor. Both of these byproducts can be reduced through bio-augmentation with specific bio-cultures. Additionally, some bio-cultures can even optimize the production of other byproducts, such as methane and hydrogen, should a bio-gas recovery program be desirable.

Most bio-remediation programs rely on periodic additions of bio-cultures which enhance the microbial action in the waste. Typical programs call additions of bio-cultures from once a day to once a month or longer. However, the bio-remediation programs currently available have problems and drawbacks. As these bio-remediation programs rely on manual methods for the addition of the bio-cultures, the optimum level of microbial action in the treated waste target is very difficult to achieve. This is because the reliance on memory and physical labor to add the necessary bio-cultures often lead to failures to add either enough of the desired bio-cultures, or to add the bio-cultures frequently enough to maintain an optimum level of microbial action. Additionally, most bio-cultures today come in a form which has a limited shelf life, and/or is not at an optimum strength or characteristic due to non-ideal shipping and storage conditions.

Therefore a need existed for a system and method of growing bio-cultures having optimized strengths and characteristics, and thus also making storage conditions moot.

Additionally, a need existed for a system and method of adding bio-cultures to wastes on an automatic programmable schedule, and in pre-programmed quantities.

SUMMARY OF THE INVENTION

An object of the present invention is to provide a system of growing bio-cultures having optimized strengths and characteristics and a method therefor.

Another object of the present invention is to provide a system of adding bio-cultures to wastes on an automatic programmable schedule, and in pre-programmed quantities and method therefor.

BRIEF DESCRIPTION OF THE PREFERRED EMBODIMENTS

In a preferred embodiment, a system for reproducing and dispensing bio-cultures for bio-augmentation is disclosed. The system for reproducing and dispensing bio-cultures for bio-augmentation, comprises: a bio-culture solution breeding tank; waste-digesting bio-culture additive placed into the bio-culture contact tank; nutrient additive placed into the bio-solution breeding tank; a bio-culture solution metering pump coupled to the bio-culture solution breeding tank; an aeration pump coupled to the bio-culture solution breeding tank; and a control system coupled to the bio-culture solution metering pump and coupled to the aeration pump.

In another embodiment, a system for reproducing and dispensing bio-cultures for bio-augmentation is disclosed. The system for reproducing and dispensing bio-cultures for bio-augmentation comprises: a bio-culture solution breeding tank; an aeration pump coupled to the bio-culture solution breeding tank; a bio-culture contact tank coupled to the bio-culture solution breeding tank; waste-digesting bio-culture additive placed into the bio-culture breeding tank; nutrients placed into the bio-culture breeding tank.

In yet another embodiment, a method of reproducing and dispensing bio-cultures for bio-augmentation is disclosed. The method of reproducing and dispensing bio-cultures for bio-augmentation comprises the steps of: providing a bio-culture growth chamber; providing waste digesting bio-culture for addition to the bio-culture growth chamber; providing nutrients for addition to the bio-culture growth chamber; providing a pumping and metering system coupled to the bio-culture growth chamber; providing an aeration pump coupled to the bio-culture growth chamber; and pumping the waste digesting bio-culture from the bio-culture growth chamber with the pumping and metering system and adding the waste digesting bio-culture to the wastes and waste byproducts.

The foregoing and other objects, features, and advantages of the invention will be apparent from the following, more particular, description of the preferred embodiments of the invention, as illustrated in the accompanying drawings.

BRIEF DESCRIPTION OF THE DRAWING

FIG. 1. is a simplified block diagram of the present invention, a system for reproducing and dispensing bio-cultures for bio-augmentation.

DESCRIPTION OF THE PREFERRED EMBODIMENTS

Referring to FIG. 1, a simplified block diagram of the present invention, a system for reproducing and dispensing bio-cultures for bio-augmentation ("the system 10" hereinafter) is shown. The system 10, in a preferred embodiment, of the present invention, comprises, a bio-augmentation system. The system 10 is a system that grows and adds a concentrated solution of bio-culture into a designated waste stream or waste collection system. Examples of the applications in which the present invention may be used, though not limited to, are listed below in table 1.

TABLE 1

Exemplary Usage Of Bio-Culture Growth and Additions.

| General Category | Category Examples |
| --- | --- |
| Pit Latrines | Pit Latrines, Outdoor Toilets, Composting Toilets. |
| Septic Tank Systems | Cesspools, Septic Tanks. |
| Holding Tanks | Portable Toilets, RV and Boat Holding Tanks. |
| Wastewater Treatment Plants | Municipal, Industrial, Package Plants, Imhof Tanks. |
| Grease Traps in Food Processing | Restaurant Grease Traps, Industrial and Protein Processing. |
| Pretreatment | Any Site that Discharges Pollutants to Waters, Separators. |
| Intensive Livestock Production | Herbaceous Livestock Production such as Swine, Cattle, Sheep, Dairy, etc. |
| Aquaculture | Non-Recirculating Aquaculture and Mariculture |
| Surface Water Remediation | Effluent and Non-Effluent Dominated Streams, Open Sewers. |
| Closed Aquatic, Horticultural or Agricultural Systems | Hydroponics, Closed Aquaculture. |
| Recirculating Systems Re-mediating Waste | Industrial, HVAC, Hazardous Waste. |
| Extra-Planetary Environments | Lunar and Planetary Environments, Near-Earth Orbit Platforms and Interplanetary Vehicles. |
| Cleaning-in-Place | Comprises CIP in dairy, wineries, breweries, drip irrigation systems. |
| Biogas Generation | Anaerobic Digesters that Produce Commercial Biogas (Methane, Hydrogen, etc.) and Chemicals (Alcohols, etc.) |

The bio-cultures comprise facultative bacteria and/or enzymes. The bio-cultures achieve the bio-conversion of organic compounds into elemental compounds, various gasses, fatty acids and water through both catabolic and metabolic enzyme digestion, under both aerobic and anaerobic conditions in order to either accelerate, or inhibit the microbial activity of the waste, and waste byproducts. Additionally, yet another feature of the present invention is to enable the rapid breakdown of specific wastes for the production of bio-gas, specifically methane and hydrogen. The production and utilization of bio-gas can positively benefit the earth's environmental conditions by the replacement of fossil fuels, and recovery of methane, both factors that otherwise contribute to global warming. The present invention can make bio-gas economically feasible, and due to continued injections/applications of methane producing bacteria into anaerobic digesters, the anaerobic conditions necessary for methane production are more easily maintained.

Many different products for the growth of bio-cultures are available on the market that are designed for this purpose. For example, bio-cultures may include, without being limited to, products such as AquaKlenz OCX and AquaKlenz UMX produced by Aqualogy BioRemedics, a division of Rothweiler Corporation, incorporated in and doing business in Phoenix, Arizona; (http://www.aqualogy.com); and Microbe-Lift available from Ecological Laboratories, Inc. of Freeport, N.Y. It will be understood by those skilled in the art that the terms: bio-culture, bacteria, enzymes, etc. may be used interchangeably herein, and the usage will be understood by those skilled in the art. Additionally, these products are typified by not only featuring bacteria or enzymes, but by also specifically including nutrients to enhance the growth of the bio-cultures. The bio-cultures, as is also explained later, added to the system 10 of the present invention, may be in either dry or liquid form. The bio-cultures that will be grown and dispensed from a preferred embodiment of the present invention, digest sludge, and inhibit undesirable by-products and malodor. The base stock, or seed bio-cultures, are replenished in the bio-reactor tank 30 on a periodic basis in order to maintain both sufficient bio-reactor tank 30 levels, and to achieve the then desired mix of specific bio-cultures. A further addition, or as part of the bio-culture source stock, is the addition of nutrients. The addition of nutrients to, or as part of, the bio-cultures is an important part of bio-culture growth. The types of nutrients is varied and is also well known in the art.

The system 10 is comprised of a variety of components whose designed objective is the controlled growth of desired bio-cultures and the controlled and accurate delivery thereof into waste or waste systems. The controlled growth of the present invention is capable of achieving microbial count increases of up to a 1000 fold or more. Referring again to FIG. 1, a bio-reactor tank 30 is shown. The bio-reactor tank 30 contains the bio-culture both for controlled growth and storage of bio-cultures, and provides a source system for the dispensing of the bio-culture into waste and waste systems. Coupled to the bio-reactor tank 30 is a contact tank 20 into which concentrated bio-cultures, or bio-culture starter concentrates may be placed, either in dry or liquid form. The concentrated bio-cultures are added via an addition opening 22. In the event that less concentrated bio-cultures, in dry or liquid form, are desired to be added to the system 10, they may be added via the fill opening 32. Additionally, if other liquid or fluids are required to be added to the system 10 to provide replacement fluids or for other purposes, they may also be added via the fill opening 32. The contents of the contact tank 20 are added into the larger bio-reactor tank 30 via the coupling 26.

The bio-cultures introduced into the bio-reactor tank 30 will be replicated by the system 10 using support systems coupled to the bio-reactor tank 30 to achieve an ideal growth environment for the bio-cultures. This ideal growth environment will result in the bio-culture forming an ultra-concentrated biological solution possessing very high Colony Forming Units (CFUs). The addition of this ultra-concentrated biological solution has the advantage of counteracting any toxins that can get into the waste systems that might destroy beneficial bacteria, thus causing a reduction in treatment capability of the unaided waste system. Additionally, far larger numbers of the beneficial and desired bacteria of the bio-culture are automatically applied to the waste than could otherwise be applied.

When the ultra-concentrated bio-culture microbes are placed into an aqueous wastewater system they can soon become the dominant organisms in the system, and bio-convert the organic contaminants into fractions of smaller molecular weight. Ultimately, many compounds will be completely metabolized by the bio-culture microbes and result in a source of carbon useful for cell growth.

The bio-cultures in the system 10 break the chemical structure from complex forms to simple forms: fatty acids, carbon dioxide and water. The microbes grown within the bio-generator tank 30, and within the waste stream, have an absolute rate of biodegradation of the contaminant. This rate of biodegradation can be accelerated by using multiple inoculations.

The ideal growth environment is achieved by the enhancement of the internal conditions of the bio-reactor tank 30. Coupled to the bio-reactor tank 30 and comprising the system 10 is an aerator pump 50. The aerator pump 50 takes a suction on the atmosphere via a suction 52, and pumps air into the bio-reactor tank 30. A $2\mu$ [micron] in-line biological filter (not shown) is used to prevent airborne bacteria from entering the bio-reactor tank 30. The air is pumped into the bio-reactor tank 30 via the air manifold 54, and bubbles into the bio-culture through the air holes 56. In a preferred embodiment, the addition of the air is used to oxygenate the bio-culture within the bio-reactor tank 30, in order to invigorate and enhance the reproduction of the bio-culture. The air pump 50 is controlled by the aerator control 86, on the control unit 80, though in the event that continuous operation of the air pump 50 is desired, it could be coupled directly to a power source. The control unit 80, and the components, or systems, coupled thereto, are provided with electrical power via a standard 120 VAC plug coupled to the control unit 80. It should be noted however, that in an alternate embodiment of the system 10, different, or higher voltage sources, or even unconventional electrical sources such as solar cell panels, e.g. in an outhouse application in a remote forest location, might be used to power an embodiment of the system 10. The system 10 also comprises a heater 82 to add heat to the bio-culture. Heat is one of the primary elements of microbial growth. This heat can be comprised of many different types, or sources, from the electromagnetic spectrum. For example: Electromagnetic growth accelerators may comprise: audible sound, ultrasound; magnetic energy; low level radiation; and photogenic accelerators, such as growing lights of optimal spectral qualities are some of the "heat" sources, or heaters, that might be utilized in an alternate embodiment of the present invention.

The heater 82 is controlled by the control unit 80. A temperature sensing unit 84, coupled to the bio-reactor tank 30, senses the internal temperature of the bio-reactor tank 30 and in combination with the temperature thermostat 90 adjusts the temperature of the bio-culture within the bio-reactor tank 30 to achieve the optimum temperature for the replication of the bio-culture. An optimum temperature is generally in the range of between about 70° F. and about 100° F.

The system 10. further comprises a re-circulation pump 60. The re-circulation pump 60 takes a suction from the bottom of the bio-reactor tank 30 via suction line 62, and discharges via re-circ discharge line 64. The re-circ discharge line 64 is coupled to a three way mixing valve 66. The three way mixing valve 66 is controlled by the selection valve control handle 72. Positioning the selection valve control handle 72 controls the proportion of re-circed bio-culture either returned to the bio-reactor tank 30 via line 68, and/or returned to the contact tank 20 via line 70. The re-circulation pump 60 is controlled by the re-circulation control 88 on the control unit 80. The re-circulation pump 60 is a special low pressure pump such as a peristaltic pump. This type of pump, a low pressure pump, is used because the hydraulic pressures internal to a standard centrifugal or positive displacement pump will cause the bio-culture to be injured due to hydraulic shock.

The system 10 further comprises a delivery system for the bio-culture. Although a preferred embodiment comprises a metering pump 40 coupled to the bio-reactor tank 30, additional methods of dispensing comprise: a spigot 42a which may be used to fill a bucket 42b (the spigot and bucket 42a and b are useful for spot additions of bio-cultures to specific locations of for flushing operations), gravity drip dispensing (not shown), and venturi suction systems. The metering pump 40 takes a suction via suction line 42. The metering pump 40, in a preferred embodiment, is a peristaltic pump to allow precise metering of the bio-culture. The output of the metering pump is via the dispensing outlet 44. The metering pump 40 is controlled by the metering control 92 on the control unit 80. The metering pump 40 is very important to the present invention because it is the controlled, and closely measured, addition of the bio-culture to the waste that makes the present invention effective. Adding small amounts of bio-culture on a frequent basis, as opposed to the bulk, infrequent method of the prior art, creates a more even distribution of the bio-culture throughout the waste system and the waste byproducts. It should be noted that optimum biological activity occurs in the treated waste at a pH of 6.8 to 7.8, and at temperatures between about 70° F. and about 100° F., and in order to enhance the affects of the present invention the user may want to utilize methods, well known in the art, and to the extent practicable in order to control the temperature and pH of the targeted waste or waste system. If the waste under treatment is in a lagoon system, the waste should be maintained, if possible, at an optimum pH above 6.0, though up to approximately pH 9 is acceptable depending on the target waste. The desired pH is achievable by the additions of buffering compounds. The careful regulation of the target waste system will allow the bio-cultures grown and delivered by the present invention to be more effective.

Exposed surface areas within the waste collection system can develop a heavy growth of selected bacteria from application of the bio-culture from the system 10 capable of degrading many types of waste including: fecal wastes; hogs, cows, chickens, etc.; animal or other organic type fats; crop residue. Additionally, the bio-culture microbes can aid in converting ammonia first into nitrite and then into nitrate. The microbial action of the bio-culture applied by the system 10 has been demonstrated to reduce ammonia levels by >95% and organic loading by >90.

Although the invention has been particularly shown and described with reference to a preferred embodiment thereof, it will be understood by those skilled in the art that changes in form and detail may be made therein without departing from the spirit and scope of the invention.

What is claimed is:

1. A method of reproducing and dispensing ultra-concentrated bio-cultures for bio-augmentation at waste sites comprising the steps of:

providing a bio-culture growth/concentration tank proximate to a waste site;

adding a seed waste digesting bio-culture to said bio-culture growth/concentration tank;

adding nutrients to said bio-culture growth/concentration tank to aid in growing said seed waste digesting bio-culture into an ultra-concentrated waste digesting bio-culture;

providing a delivery system coupled to said bio-culture growth tank;

providing aeration to said bio-culture growth/concentration tank to aid in growing said seed waste digesting bio-culture into an ultra-concentrated waste digesting bio-culture; and dispensing said ultra-concentrated waste digesting bio-culture from said bio-culture growth/concentration tank with said delivery system and adding said ultra-concentrated waste digesting bio-culture to said waste site.

2. The method of claim 1 further comprising the step of heating said bio-culture growth/concentration tank to aid in growing said seed waste digesting bio-culture into an ultra-concentrated waste digesting bio-culture.

3. The method of claim 2 further comprising the step of re-circulating said waste digesting bio-culture within said bio-culture growth/concentration tank to aid in growing said seed waste digesting bio-culture into an ultra-concentrated waste digesting bio-culture.

* * * * *